Nov. 4, 1969         T. F. RISTAU         3,476,345
MOUNTING ARRANGEMENT FOR COLLAPSIBLE STEERING COLUMNS
Filed March 15, 1968

INVENTOR.
Theodore F. Ristau
BY
D. L. Ellis
ATTORNEY

United States Patent Office 3,476,345
Patented Nov. 4, 1969

3,476,345
MOUNTING ARRANGEMENT FOR COLLAPSIBLE STEERING COLUMNS
Theodore F. Ristau, Saginaw, Mich., assignor to General Motors Corporation, Detroit, Mich., a corporation of Delaware
Filed Mar. 15, 1968, Ser. No. 713,534
Int. Cl. F16m *13/02;* B60r *21/02*
U.S. Cl. 248—221                                  4 Claims

ABSTRACT OF THE DISCLOSURE

An upper steering column support bracket assembly includes a bracket member having its mounting flanges disposed at an angle substantially divergent from the steering column axis and mounting capsules are releasably interengaged on the bracket member by guide channels similarly angled to the column axis so that upon attachment of the capsules to the vehicle body instrument panel, the bracket will release from the capsules under bending moments of predetermined force applied to the column as well as under axial force loading thereon.

---

This invention relates to collapsible steering column assemblies and more particularly to a releasable mounting bracket arrangement for such steering column assemblies.

In U.S. Ser. No. 582,742 filed Sept. 28, 1966, by Edward G. Curtindale and assigned to the assignee of the present invention, there is disclosed a mounting bracket assembly for collapsible steering columns in which a bracket is provided for direct securement to the steering column and which has slidably interengaged therewith one or more mounting capsules which are in turn directly fastenable to the instrument panel or like supporting structure of the vehicle body to thereby mount the bracket member and steering column thereon. The bracket member and the capsules are releasably interconnected by means of shearable plastic or like pins which are set to fail under a predetermined loading on the column such that the column and bracket may readily disengage from the capsules and displace relative to the instrument panel freely of any binding or other interference therewith.

The instant invention provides further improvement in this art and particularly with reference to the Curtindale assembly in that the interengaged bracket member and capsules are constructed to be slidably releasable one from the other when the steering column is subjected to bending moments such as those tending to deflect the upper end of the steering column upwardly and/or forwardly toward the instrument panel, as well as being releasable under axial force loading on the column.

A further feature of the invention resides in the use of bracket member which has its mounting flanges inclined at a predetermined angle to the axis of the steering column and which have interengaged thereon one or more mounting capsules which partake of this angularity to readily permit release of the flanges therefrom under bending moments or axial loading on the column.

Another important feature of this invention resides in so constructing the interengaged bracket member and mounting capsules as to provide for this angularity for bending moments on the column yet allow the capsules to be engaged with a mounting surface on the instrument panel or other column support structure which is disposed for parallel relationship with the column axis, thereby to allow the steering column and bracket assembly to be longitudinally adjustable relative to the mounting surface for proper installation within the vehicle body.

These and other features of the invention will be readily apparent from the following specification and the drawings in which.

Figure 1:
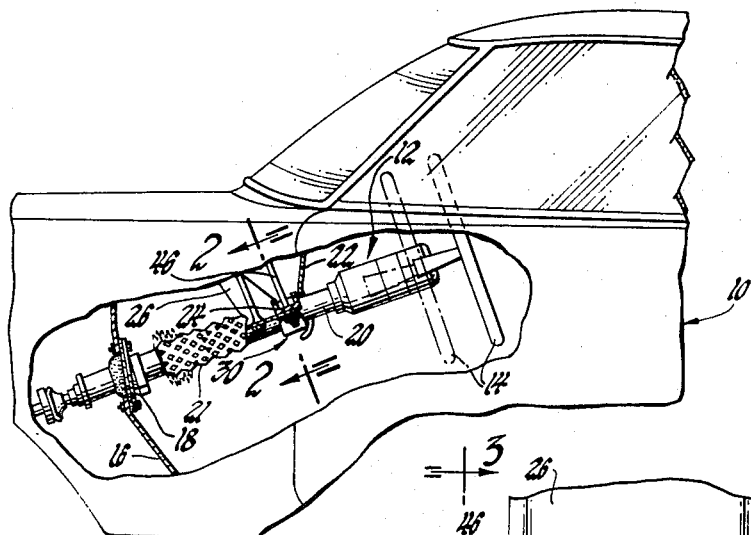
FIGURE 1 is a fragmentary partially broken away sectional view of an automotive vehicle body including collapsible steering column structure embodying a mounting bracket arrangement according to the invention.

Referring now particularly to FIGURE 1 of the drawings, there is shown a collapsible energy absorbing steering column system for an automotive vehicle body 10 and being of the type including a collapsible steering column assembly 12 which mounts interiorly of the body a steering wheel 14 and which extends through the firewall 16 of the body to connect with the vehicle steering gear not shown. Adjacent its lower end at the firewall 16, the column has rigid mounting thereto by a bracket assembly 18. For further description and details of this lower bracket as well as the functional and structural characteristics of column assembly 12, reference may be had to the Wight et al. application, Ser. No. 546,312 filed April 29, 1966, and assigned to the assignee of the present invention.

Basically, column assembly 12 embodies an outer mast jacket or tube 20 including an energy absorbing portion 21 adapted to provide controlled resistance to axial collapse of the column assembly forwardly of the body 10 as between the positions of steering wheel 14 shown in solid and broken lines. The column assembly is also operative to receive and dispose of impact energy directed rearwardly of the vehicle body when such energy is sufficient to deform firewall 16 and to in turn deform energy absorbing portion 21 against the reaction provided by the mounting of column assembly 12 at the instrument panel area of the body. Such instrument panel structure typically includes an instrument or face panel 22 extending transversely of the body between the number one or forward door pillars thereof and further includes a reinforcing channel structure 24 structurally integrated at its ends with such pillars for rigidity. Additionally, a reinforcing brace member 26 extends downwardly and rearwardly in the area of column assembly 12 from rigid connection with the firewall and the cowl or plenum structures of the body to be connected with channel 24 and face panel 22.

Figure 2:
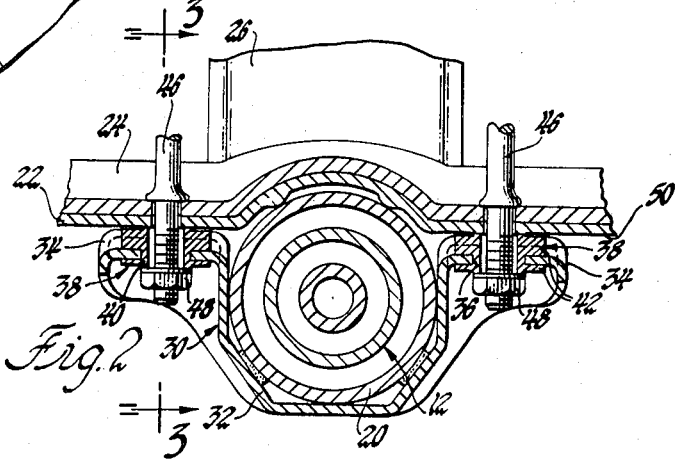
FIGURE 2 is an enlarged sectional view taken generally along the plane indicated by lines 2—2 of FIGURE 1.
Figure 4:
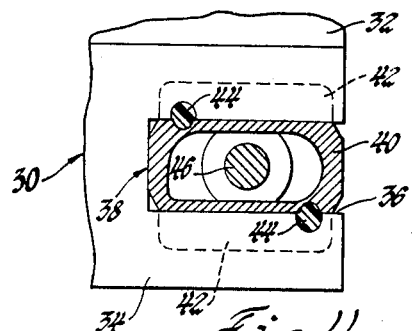
FIGURE 4 is an enlarged sectional view taken generally along the plane indicated by lines 4—4 of FIGURE 3.
Figure 5:
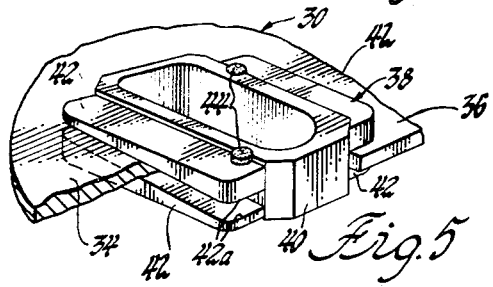
FIGURE 5 is a fragmentary perspective view.

The Curtindale application, above-identified, discloses upper support bracket structure for releasable securement of column assembly 12 to this instrument panel structure of the body. In general accordance with this disclosure there is shown herein, best in FIGURE 2, a bracket member 30 of generally U-shaped configuration including a central portion 32 shaped to firmly embrace the mast jacket 20 of column assembly 12 and which is fixedly attached thereto as by welding or by bolts. At either side of this portion bracket 30 includes flanges 34 each provided with a rearwardly opening slot 36, FIGURE 4. Received in such slot is a mounting capsule or support means 38 of die-cast aluminum or similar construction and which includes an apertured central body portion 40 closely slidably receivable in slot 36. At either side of the body portion, there is a pair of bracket receiving flanges 42 defining therebetween a slot or channel closely sized to the stock thickness of flange 34 whereby to firmly yet slidably embrace the flange at each side of the slot 36. As best seen in FIGURES 4 and 5, the capsule 38 is releasably secured to each flange 34 by the in situ injection molding of thermoplastic or like pins or slugs 44 afforded by suitable apertures in flanges 42 each aligning with a similar aperture in the interengaged portion of flange 34 of the bracket. Column assembly 12 is mounted to the instrument panel of body 10 by placing the bracket 30 with its capsules 38 against face panel 22 to have the capsules receive projecting threaded ends of a pair of hanger bolts 46 extending downwardly from rigid connection with the vehicle body cowl structure and through apertures in the channel 24 and face panel 22. Nuts 48 are threaded over bolts 46 to securely engage the caspules against the face panel 22 for rigid securement of the column assembly 12 on the instrument panel structure.

In operation, a force loading on column assembly 12 in a direction forwardly of the body 10 and sufficient to begin deformation of energy absorbing portion 20 for collapse of the column will immediately transfer from the mast jacket 20 of the column assembly through bracket 30 such as to apply a shear load on the molded pins 44 generally in the planes of the edges of slots 36. The pins are preferably set for failure at a load well below that attending the initial deformation of the energy absorbing portion 21. Upon shear of the pins, bracket flanges 34 with their open-ended slots 36 are released for unimpeded sliding movement out of capsules 38, which remain held on the instrument panel structure by the hanger bolts 46 and nuts 48, and the collapse of column assembly 12 may thus proceed without interference from further restrictive attachment to the instrument panel structure. In the event of deformation of the forward areas of vehicle body 10 sufficient to result in a rearward deformation of firewall 16, the loading on the firewall transfers through mast jacket 20 of the column assembly 12 to find reaction at the instrument panel structure including the channel 24 and the brace 26. This is of course due to bracket 30 being prevented from rearward movement relative to such structure by the abutment or bottoming of the bracket at the ends of its slots 36 directly on the capsules 38 and in turn on the hanger bolts 46.

By the present invention, bracket 30 and capsules 38 are provided with an interengagement relationship whereby the bracket will readily release not only under pure longitudinal or axial force loading directed forwardly along column assembly 12, but also under bending moments or forces applied laterally of the axis of the column in the area of the instrument panel attachment thereof. In particular, it has been found that when a vehicle occupant engages steering wheel 14 during severe vehicle deceleration conditions sufficient to cause collapse and energy absorption in column assembly 12, it sometimes happens that the occupant bears on the steering wheel in such a way as to apply his inertial forces on the column in a direction angled substantially upwardly and forwardly of the steering column axis, thereby creating a bending moment thereon tending to bow the steering wheel end of the column upwardly toward the instrument panel structure.

Figure 3:
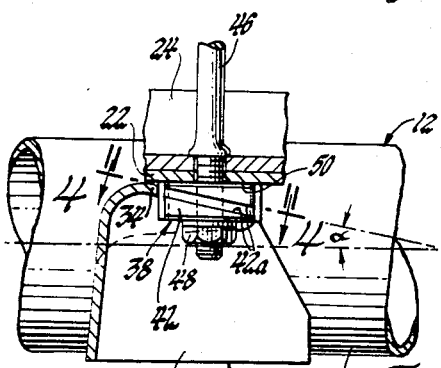
FIGURE 3 is a sectional view taken generally along the plane indicated by lines 3—3 of FIGURE 2.

The instant structure insures easy release of bracket 30 from the capsules 38 under such conditions. As best seen in FIGURES 3 and 5, flanges 34 of the bracket 30 are so formed relative to the central portion 32 thereof as to be disposed at a substantial angle α to the axis of column assembly 12. Also, the flange or side portions of the capsules 38 are formed with their flange receiving channels disposed at a like angle to the top and bottom faces of body portions 40 to define inclined guide faces 42a of the capsule. With the capsules 38 installed with their interengaging faces 42a on flanges 34 and the capsules in turn mounted to have their upper faces bear directly against the mounting surface 50 of face panel 22, FIGURE 3, the bracket is subject to release from the capsules under either a purely axial force loading on column assembly 12 or a bending moment thereon experienced as a force lateral to the column axis on the capsules 38. Considering in particular a purely axial force loading on column assembly 12, it is seen to resolve over angle α into a substantial component directed along the plane of guide faces 42a and operative for shear of pins 44, and a component normal thereto directed downwardly by flanges 34 on the capsules. Under a bending moment tending to an upward bowing of the column assembly as described above, the resulting lateral force or force exerted upward and normal of the axis of the column assembly through bracket 30, resolves over angle α into a component directed upwardly and normal to the plane of guide faces 42a, and another component in such plane operative for shear of the pins 44. The angle α is of course selected for best results having in mind the angle of inclination of the column assembly 12 relative to the horizontal or vertical datum line of the vehicle, its dimensional relationship with the vehicle operator's seat, and the range of the angles of engagement of the operator's torso with the steering wheel 14 in these conditions. The pins 44 are set for failure at a load level well below that required for column collapse taking into account the effect of angle α on the actual shear load experienced by the pins. In no event is the other force component normal to the shear component on capsules 38 sufficient to cause any substantial impeding friction between flanges 34 and capsules 38 and this is, of course, considered in the selection of the angle α.

In practice with use of full scale simulated impact sled and barrier tests with vehicles and column assemblies of assignee's manufacture, it is found that angle α is best placed in the range of 5 to 10° inclined upwardly from the steering column axis such as shown generally in FIGURE 3.

It should be appreciated that in lieu of the inclined guide faces 42a disposed angularly relative to the upper mounting face of capsule 38, it is contemplated that the guide channels could be formed parallel thereto to receive the angularly disposed flanges 34. The upper mounting face of each capsule would accordingly be disposed angularly of the steering column axis by the angle α, and to meet the objectives of the invention would thus be engaged on a mounting surface such as surface 50 which is similarly angularly disposed relative to the column axis.

The mounting bracket arrangement shown in the drawing is, however, preferable to this above alternate arrangement in that the mounting surface 50 of the face panel 22 is kept generally parallel the column axis so that the column assembly 12 may be readily adjusted longitudinally within the vehicle body for proper installation therein simply by movement along its axis relative to the steering gear and to the instrument panel area. The degree of such adjustment is reflected by the length of the bolt receiving apertures in body portions 40 of capsules 38.

Having thus described the invention, what is claimed is:

1. In automotive vehicle collapsible steering column structure of the type including a collapsible steering column assembly mountable to column support structure of a vehicle body, a support bracket fixed to said column assembly, and support means on said support structure slidably interengaged with said bracket for supporting the latter on said support structure, said bracket being slidably releasable from said support means upon the application of a predetermined force to said column assembly for displacement of said bracket and said column assembly relative to the support structure and said support means, the improvement which comprises constructing said bracket and said support means to have slidable interengagement on guide faces thereof directed angularly with respect to the axis of said column assembly such that said bracket and said column assembly are slidably releasable from said support means and said support structure under the application of a bending moment to said column assembly as well as under forces applied axially thereof.

2. In a vehicle having steering column support structure and a steering column mountable on the support structure, steering column mounting means comprising, a mounting bracket including a portion securable to said column and at least one mounting flange, a support structure engaging mounting capsule releasably securable to said flange, said capsule and said flange being releasably slidably interengaged along opposed guide surfaces thereof directed along a plane so angularly related to said securable portion of the bracket as to be disposed at a substantial angle to the axis of said column such that upon fastening of said capsule to the support structure said bracket is readily releasable from said capsule under bending moments applied to said column as well as forces applied axially thereof.

3. Steering column mounting means as recited in claim 2 wherein said capsule has a mounting face parallelly engageable with a mounting surface of the support structure which is adapted for generally parallel association with the axis of the steering column, said guide surfaces of said capsule and said bracket being angularly related to said mounting face.

4. In mounting bracket structure for a collapsible steering column mountable to vehicle body column support structure and being of the type including a mounting bracket including a portion securable to the steering column and at least one mounting flange, and a support structure fastened mounting capsule receivable in an open ended slot of said flange and including a body portion providing a mounting face parallelly engageable with a surface of the support structure which is disposed for generally parallel association with the column axis, said capsule further including at either side of said body portion a pair of flanges defining a flange receiving channel, and shearable means releasably connecting said capsule to said flange to permit release of said bracket and said column for collapse thereof relative to said capsule and said support structure under the application of a predetermined load to said column, the improvement which comprises constructing said capsule to have said side portion flange receiving channels thereof related angularly a predetermined amount to the mounting face of the body portion of said capsule and constructing said flange of said bracket at a like angle relative to the axis of said column for reception in said channels such that the inter-engaging surfaces of said flange and said capsule are disposed for slidable release of said bracket from said capsule under the application of a bending moment to said column as well as under forces applied axially thereof.

References Cited

UNITED STATES PATENTS

| 3,373,629 | 3/1968 | Wight et al. | 74—492 |
| 3,373,965 | 3/1968 | Bien et al. | 74—493 |
| 3,394,613 | 7/1968 | Curtindale | 74—492 |
| 3,415,140 | 12/1968 | Bien et al. | 248—221 X |
| 3,434,367 | 3/1969 | Renneker et al. | 180—82 X |

ROY D. FRAZIER, Primary Examiner

J. F. FOSS, Assistant Examiner

U.S. Cl. X.R.

74—492; 180—82; 248—205